(12) United States Patent
Lu et al.

(10) Patent No.: US 8,270,772 B2
(45) Date of Patent: *Sep. 18, 2012

(54) IMAGE RESIZING FOR WEB-BASED IMAGE SEARCH

(75) Inventors: Yan Lu, Beijing (CN); Feng Wu, Beijing (CN); Richard J. Qian, Sammamish, WA (US); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,111

(22) Filed: Oct. 31, 2011

(65) Prior Publication Data

US 2012/0045118 A1     Feb. 23, 2012

Related U.S. Application Data

(63) Continuation of application No. 12/113,007, filed on Apr. 30, 2008, now Pat. No. 8,081,842, which is a continuation-in-part of application No. 11/851,653, filed on Sep. 7, 2007.

(60) Provisional application No. 61/042,610, filed on Apr. 4, 2008.

(51) Int. Cl.
*G06K 9/32* (2006.01)
*G06K 9/36* (2006.01)
*G06K 15/02* (2006.01)
*G09G 5/00* (2006.01)

(52) U.S. Cl. .......... 382/298; 382/240; 358/1.2; 345/660

(58) Field of Classification Search .................. 382/232, 382/239, 240, 255, 284, 298, 299, 300, 305, 382/312; 358/1.2, 539, 540; 345/606, 629, 345/660, 670, 671; 348/14.13; 375/240.19, 375/240.21
See application file for complete search history.

(56) References Cited

U.S. PATENT DOCUMENTS 5,692,012 A    11/1997    Virtamo et al.
5,926,222 A    7/1999    Nickerson
(Continued)

OTHER PUBLICATIONS

Desai, "Image Processing with QccPack and Python," retrieved at at <<http://www.linuxjournal.com/article/9692>>, Jul. 1, 2007, pp. 5.

(Continued)

*Primary Examiner* — Kanjibhai Patel
(74) *Attorney, Agent, or Firm* — Lee & Hayes, PLLC

(57) ABSTRACT

Image resizing for web-based searching is described. In one implementation, a system resizes a user-selected thumbnail image into a larger version of the image that emulates the quality of a large, original image, but without downloading the original image. First, the system extracts resizing parameters when each thumbnail image is created. Then, the system creates a codebook of primitive visual elements extracted from a collection of training images. The primitive visual elements in the codebook provide universal visual parts for reconstructing images. The codebook and a resizing plug-in can be sent once to the user over a background channel. When the user selects a thumbnail image for enlargement, the system resizes the thumbnail image via interpolation and then refines the enlarged image with primitive visual elements from the codebook. The refinement creates an enlarged image that emulates the quality of the large, original image, without downloading the original image.

20 Claims, 10 Drawing Sheets

U.S. PATENT DOCUMENTS

| | | | |
|---|---|---|---|
| 5,926,569 | A | 7/1999 | Nickerson |
| 5,987,459 | A | 11/1999 | Swanson et al. |
| 6,147,695 | A | 11/2000 | Bowen et al. |
| 6,181,825 | B1 | 1/2001 | Ragland et al. |
| 6,310,601 | B1 | 10/2001 | Moore et al. |
| 6,377,706 | B1 | 4/2002 | de Queiroz |
| 6,545,687 | B2 | 4/2003 | Scott et al. |
| 6,591,017 | B1 | 7/2003 | Fukuhara et al. |
| 6,990,246 | B1 | 1/2006 | Ferguson |
| 7,133,050 | B2 | 11/2006 | Schowtka |
| 7,346,225 | B2 | 3/2008 | Guenter |
| 7,376,275 | B2 | 5/2008 | Simard et al. |
| 8,103,111 | B2 * | 1/2012 | Horie et al. .................. 382/232 |
| 2002/0118883 | A1 | 8/2002 | Bhatt |
| 2006/0253491 | A1 | 11/2006 | Gokturk et al. |
| 2007/0109616 | A1 | 5/2007 | Thompson |
| 2007/0258656 | A1 | 11/2007 | Aarabi |
| 2009/0252431 | A1 | 10/2009 | Lu et al. |

OTHER PUBLICATIONS

Mitra, "Efficient Image and Video Processing," available at least as early as Nov. 16, 2007, at <<http://www.ucop.edu/research/micro/01_02/01_059.pdf>>, pp. 4.

* cited by examiner

```
if (uIA >= IA && uIA >= uA)

refA = min(IA, uA);

else if (uIA <= IA && uIA <= uA)

refA = max(IA, uA);

else refA = uA + IA – uIA;
```

IMAGE RESIZING FOR WEB-BASED IMAGE SEARCH

RELATED APPLICATIONS

This application is a continuation of U.S. patent application Ser. No. 12/113,007, filed Apr. 30, 2008, which is a continuation-in-part of U.S. patent application Ser. No. 11/851,653, filed Sep. 7, 2007 and which claims priority to U.S. Provisional Patent Application No. 61/042,610, filed Apr. 4, 2008, all of which are incorporated herein by reference.

BACKGROUND

Web-based image services and applications (e.g., image searching on the web) enrich each user's experience. Web applications distinguish themselves through the richness of their features, and many use thumbnail images ("thumbnails") to present a collection of images on the limited physical area of a display screen. Thumbnail images are small, icon-size versions of a larger original image and are one of the most common components of web-based image searching applications, allowing users visual control over a large number of images that visible on one page. One main value of thumbnails is that the user can select a thumbnail in order to see the corresponding original image at a larger resolution. In many cases, however, there is an undesirable delay while the image data of the larger resolution version downloads over a network, such as the Internet.

There are several conventional ways to improve the performance of enlarging a thumbnail at the client side. A straightforward solution is to redirect the user to the web server that is hosting the original image or to deliver a larger version to the client through a background channel. In either case, this inevitably taxes the bandwidth and may increase latency. Another intuitive solution is to directly enlarge the thumbnail image itself at the client side. Specifically, there are a number of traditional image interpolation methods that can be applied, e.g., bilinear and bi-cubic interpolation methods. However, these methods usually blur the discontinuities, sacrificing visual quality.

SUMMARY

Image resizing for web-based searching is described. In one implementation, a system resizes a user-selected thumbnail image into a larger version of the image that emulates the quality of a large, original image, but without downloading the original image. First, the system extracts resizing parameters when each thumbnail image is created. Then, the system creates a codebook of primitive visual elements extracted from a collection of training images. The primitive visual elements in the codebook provide universal visual parts for reconstructing images. The codebook and a resizing plug-in can be sent once to the user over a background channel. When the user selects a thumbnail image for enlargement, the system resizes the thumbnail image via interpolation and then refines the enlarged image with primitive visual elements from the codebook. The refinement creates an enlarged image that emulates the quality of the large, original image, without downloading the original image.

This summary is provided to introduce the subject matter of image resizing for web-based image searching, which is further described below in the Detailed Description. This summary is not intended to identify essential features of the claimed subject matter, nor is it intended for use in determining the scope of the claimed subject matter.

BRIEF DESCRIPTION OF THE DRAWINGS

FIG. 6 is a diagram of exemplary predictive coding of 9×9 blocks.

DETAILED DESCRIPTION

Overview

This disclosure describes an image resizing system for web-based image browsing and searching. An exemplary system applies innovative learning-based techniques that enable a user to enlarge a small thumbnail image to the original size image without actually downloading the original image. Instead, the exemplary system achieves this revolutionary effect by using primitive visual elements and an exemplary codebook to forego downloading the bulk of images at their full resolution.

As a brief summary of the theory underlying the exemplary image resizing system, contents of images may vary broadly, but the primary visual elements (e.g., edge, color, shape, texture) always exist in various natural images. Thus, the exemplary system enlarges a small image using these elements learned from some training images, as building blocks. The exemplary codebook is trained from images collected from popular image search queries, then compressed to reduce file size, and delivered to clients through background channels. In one implementation, with the received codebook and an image resizing plug-in, users can directly enlarge thumbnails of interest with automatic quality and complexity control, but without having to download a larger image.

Exemplary System Architecture

Web-based image searching is described as an exemplified application for the example image-resizing system architecture described herein. The image-resizing system conducts online serving of image search queries based on offline-built indices and thumbnails. At the server side, a large volume of images are crawled offline from the Internet in order to build ranked searching indices and to generate thumbnail images stored in the serving nodes. Meanwhile, these images, which are selected from popular queries, are fed into an image trainer to create a codebook (or its enhancement) that can be delivered offline to clients. At the client side, users enlarge the received thumbnail images to a pre-defined resolution based on the codebook, without downloading the original images.

The goal of the innovative training-based image resizing is to provide a high degree of quality control for thumbnail previewing in web-based image applications and thereby enhance the enjoyment of the user's experience.

Figure 1:
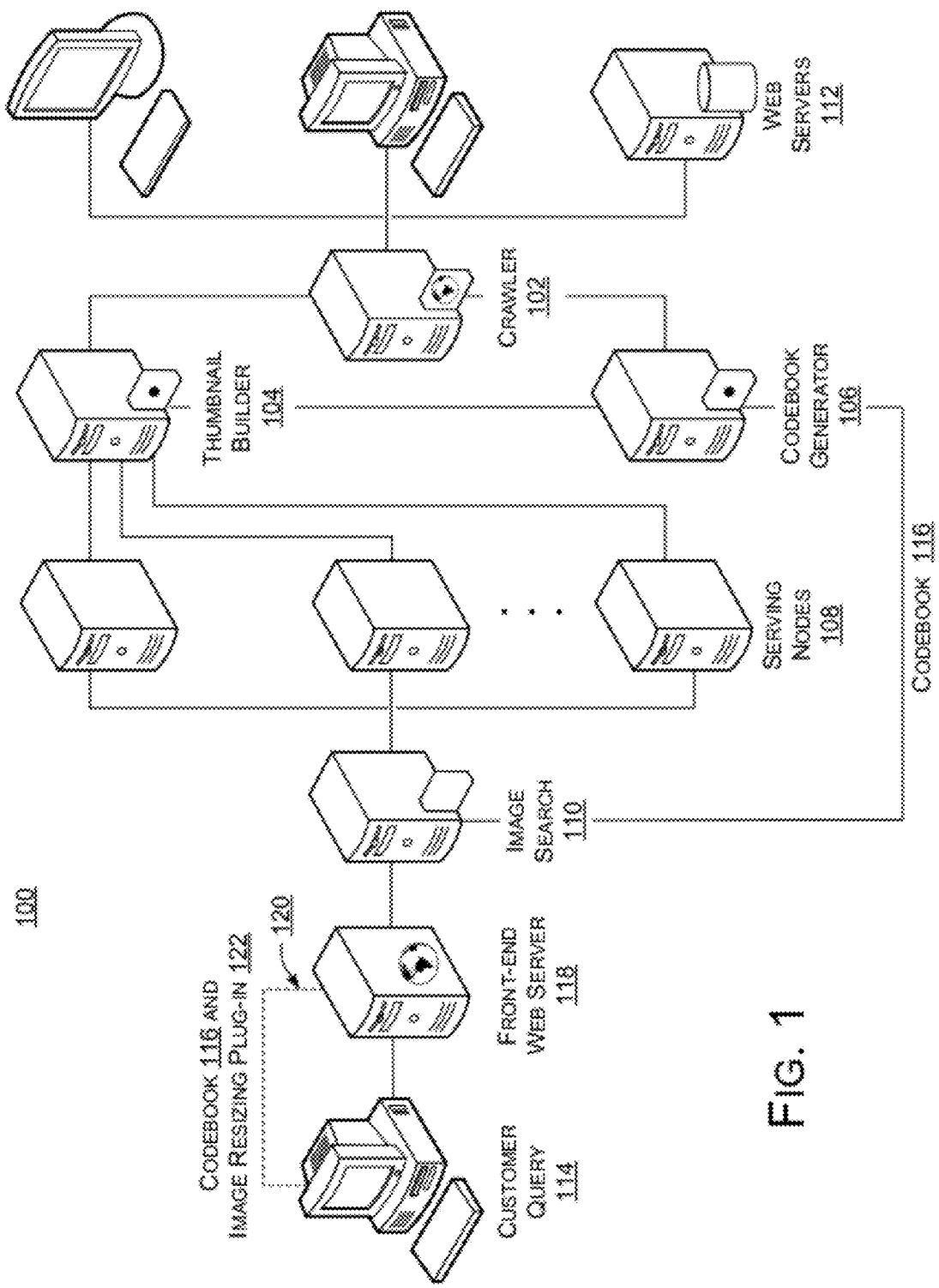
FIG. 1 is a diagram of an exemplary image-resizing system architecture for web-based searching.

FIG. 1 depicts an illustrative web-based image search system 100 that employs training-based thumbnail image resizing. The servers include a crawler 102, a thumbnail builder 104 and a codebook generator 106 as well as other innovative and conventional components (e.g., serving nodes 108, an index builder, and image search engine 110). Similar to conventional image search systems, the crawler 102 is used to collect images at their original resolutions from web servers 112 throughout the Internet. These crawled images are then analyzed to extract metadata and downsized to thumbnails. The thumbnail builder 104 can be a conventional server implementation but capable of some additional operations to implement exemplary image resizing. The codebook generator 106 creates the codebook 116, to be used for learning-based image resizing at the client side 114. As shown in FIG. 1, the trained and compressed codebook 116 can be stored at the image search engine 110 or in a front-end web server 118, and then delivered to the end user 114 through a background channel 120 upon request. To have the best degree of user experience, the codebook 116 is trained with images corresponding to statistically popular image queries.

The service for image search querying can have similar operation to existing applications, such as MICROSOFT's LIVE image search (Microsoft Corp., Redmond, Wash.). The client-side user 114 can thus conduct conventional operations such as previewing thumbnail images associated with search results. In addition, exemplary image-resizing engine components (FIGS. 8 and 9) can be received at the user's browser as a plug-in 122. Thus, both the plug-in 122 and the codebook 116 can be delivered to users 114 through the background channel 120. With the exemplary plug-in 122, the user 114 can enlarge thumbnail images of interest to a specified larger resolution, without downloading their respective original images. The same codebook 116 can be used to enlarge thumbnail images generally. A codebook update is also supported in the exemplary image-resizing system 100, because the popularity of image queries varies from time to time. To save costs at both servers and clients 114, the codebook 116 adapts to new popular queries via incremental training. Thus, only the updated part or the "delta" between the former version and the updated codebook 116 is delivered to users 114, e.g., through a background channel 120.

Exemplary Server-Side Components and Methods

Figure 2:
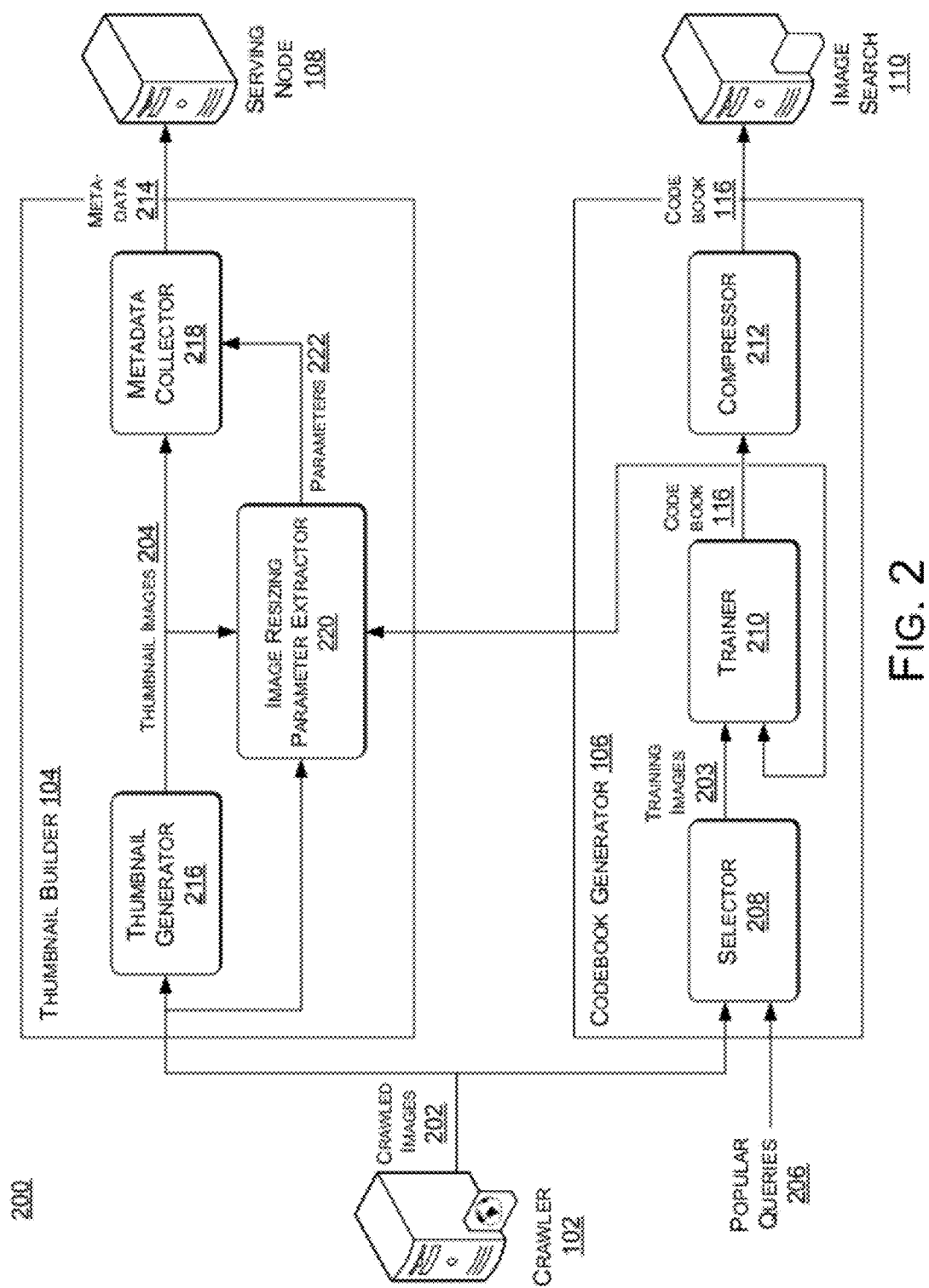
FIG. 2 is a block diagram of server-side components for thumbnail building and codebook training.

FIG. 2 depicts exemplary server-side components 200 and shows relationships between the crawler 102, codebook generator 106, and thumbnail builder 104. The crawler 102 conducts the conventional operations of crawling images from the Internet or other image sources. The crawled images 202 are then used to train the codebook 116 and build thumbnails 204. It should be noted that it is unnecessary to store the crawled images 202 in these servers after processing. Detailed operation of the codebook generator 106 and the thumbnail builder 104 are now described.

In the codebook generator 106, the selector 208 uses statistically popular queries 206 to choose crawled images 202 to become training images 203 for learning. In other words, only images with high popularity among the top queries are used for training. As introduced above, although in general the contents of images may vary broadly, the primary or "primitive" visual elements, such as edge, color, shape, texture, etc., exist ubiquitously among a variety of natural images. The training module ("trainer") 210 extracts these primitive visual elements as exemplars for generic image reconstruction.

In one implementation, the trainer 210 extracts a generic set of edge-centered N×N pixel patches ("primitive patches") as primitive visual elements and stores this set of image building blocks in the codebook 116. Then the stored primitive patches can be used as general-purpose, fundamental parts for rebuilding many images. As shown in FIG. 2, the exemplary system 100 also supports incremental training. When the popular queries 206 change, some newly crawled images 202 are used to update the codebook 116. Exemplary training methods will be described in a section further below. The compressor 212 processes the trained codebook 116 to save data space and transmission bandwidth. Exemplary compression techniques are also described more fully below.

In one implementation, the thumbnail builder 104 uses conventional techniques or a conventional thumbnail generator 216 to create the thumbnail images 204 and extracts image metadata, such as image size information, for compilation by a metadata collector 218. In addition, an "image-resizing-parameter" extracting module ("parameter extractor") 220 collects parameters 222 to improve image resizing.

A thumbnail image 204 of each original image 202 is enlarged and then quality-refined based on the trained codebook 116, and the enlarged image is then compared to the originally crawled image 202. If the distortion (e.g., the mean square error, MSE) is smaller than a threshold, then in one implementation, a flag with "1" indicating "suitable for codebook-based resizing" is created; otherwise, a flag with "0" indicating "un-suitable" is created. The flag can correspond to either an entire image or a region. In the latter case, a collection of flags is created as metadata information 214.

Exemplary Codebook Training—Introduction

In the exemplary image-resizing system 100, the primitive visual elements can be edge-centered N×N patches, dubbed "primitive patches" as introduced above. The edges for generating the primitive patches are extracted by convolving image signal I(x) with a derivative of a Gaussian function at scale $\sigma$ and orientation $\theta$. An edge point is identified by detecting the local maximum in the magnitude of the response. Then, the system extracts primal sketch regions along the edge points whose local maximum is recognized as an edge. After high-pass filtering, the patches containing high frequency signal content of the primal sketch regions are treated as primitive patches.

A detailed description of the training process is provided in a section below. But in brief summary, given an input image, the trainer 210 introduces a distortion module to simulate the process of lossy compression. For example, the trainer 210 can employ a down-sample filter followed by an up-sample filter in the distortion module. Orientation-energy-based edge detection is then performed on the reconstructed distorted image. According to the detected edge information, primal sketch regions are determined on both the high-pass filtered distorted image and differential signal between the original image and the distorted image. In this training, the trainer 210 treats a distorted primitive patch and the differential primitive patch at the same position as a "pair" in the following process. The differential is the delta that can be added to restore the distorted image back to near the quality of the original image. After normalization, a pair of primitive patches is categorized into several categories by an edge classifier according to the edge type and orientation of the distorted primitive patch, and stored into the training set correspondingly. Consequently, certain clustering approaches may be applied to shrink the size of training set to a desired level. This process, along with some background, is now presented in detail.

Detailed Description of Codebook Training

The concept of primitive visual elements has been discussed extensively in the literature of computer vision. A primitive visual element is a graphics element used as a building block for creating images. Image primitive elements, which aim for direct insertion into the visual attributes of an image, consist of individual graphic entities. Such a primitive element can be a line, a vector, a texture, or other visual feature. Within the scope of visual features, each feature can be further classified as a general feature (e.g., color, texture, shape, etc.) or a domain-specific feature that is application-dependent, such as directed for rendering human faces. In fact, some of the primitive features have been utilized in image compression that is based on statistical principles, for example, compression by vector quantization, matching pursuit, edge-based schemes, etc.

In one implementation, the exemplary image resizing system 100 uses the general primitives that are retrieved by visual pattern analysis and represented by image exemplars. On one hand, primitive elements, such as lines, junctions, edges, and so forth, are robust in terms of perceptual quality. On the other hand, not all primitive elements can be well-studied in order to preserve a desired quality. The next section describes how to analyze these issues.

Problem Statement

Consider an image compression scenario between theoretical encoder and decoder as an illustrative setting for describing primitive visual element theory and dynamics. In an image set $\{I_k\}_{k=1}^{\infty}$, each member takes values in a finite alphabet $\Lambda(|\Lambda|)=256$. Using a traditional compression system, $I_k$ can be compressed into a code $C_k$ by an encoding function $f:\Lambda^n \rightarrow \{0,1\}^*$, i.e. $C_k=f(I_k)$, where $\{0,1\}^*$ represents 0-1 sequences. On the decoder-side, a decoding function $g:\{0,1\}^* \rightarrow \Lambda^n$ is applied to present a reconstruction $\tilde{I}_k, \tilde{I}_k=g(C_k)$. Thus, a traditional compression processing function, which is composed of an encoder and a decoder, can be formulated as $\phi:I_k \rightarrow \tilde{I}_k=\phi(I_k)(=g \cdot f(I_k))$. Then the encoding rate distortion optimization is obtained as in Equation (1):

$$\min(D(I_k, \tilde{I}_k) + \lambda R_k), \quad (1)$$

where $\lambda$ is a weighted factor, $R_k$ is the length of $C_k$ in bits and $D(I, \tilde{I}_k)$ is the distortion between I and $\tilde{I}_k$ determined by a fidelity measure D.

When some sort of knowledge is involved in compression, the encoding function is defined as in Equation (2):

$$f_i \equiv f_i: \Lambda^n \xrightarrow{L\{\xi, \Omega_i\}} \{0,1\}^*, \quad (2)$$

where L( ) is a learning process, represents a type of primitive element, and $\Omega_i$ is one subset of image set $\{I\}_{k=1}^{\infty}$ labeled by i. Correspondingly, the reconstructed image is obtained by $\tilde{I}_k=g(C_k|L(\xi,\Omega_j))$, where the function g is shown in Equation (3):

$$g_j \equiv g_j: \{0,1\}^* \xrightarrow{L\{\xi, \Omega_j\}} \Lambda^n. \quad (3)$$

In typical learning-based coding schemes, the learned knowledge $L(\xi,\Omega)$ is required to be the same among decoders so that the decoders can provide a unique reconstruction for an input image. Furthermore, the learned knowledge should also be identical at both encoder and decoder to ensure correct decoding and equivalent quality as well.

In the exemplary system 100, as different training sets can be used, the server side components constructs image $\tilde{I}_k^i$ as in Equation (4):

$$\tilde{I}_k^i = g_i(C_k|L(\xi,\Omega_i)) \quad (4)$$

while the client-side components create a reconstruction $\tilde{I}_k$ as in Equation (5):

$$\tilde{I}_k^j = g_j(C_k|L(\xi,\Omega_j)). \quad (5)$$

The compression distortions at the encoder and decoder are $\overline{D}(I_k,\tilde{I}_k^i)$ and $\overline{D}(I_k,\tilde{I}_k^j)$, respectively, measured by quality assessment matrix $\overline{D}$. Then, the rate-distortion optimization is obtained as in Equation (6):

$$\underset{t}{\operatorname{argmin}}(\overline{D}(I_k, \tilde{I}_k^t) + \lambda R_k), \quad (6)$$

where $t \in \{i,j\}$. Accordingly, a target is to find a proper type of primitive elements $\xi$ subject to Equation (6) to make the server-side and client-side components have similar distortions though their reconstructed images could be different in terms of pixel values.

Exemplary Selected Primitive Elements

In one implementation, as mentioned, primal sketch-based primitive patches are used as the primitive visual elements in the exemplary system 100. Primal sketch, a known technique, can thus provide primitive elements for the exemplary system 100. The primal sketch model is an important contribution in computer vision, made first made by D. Marr, in *Vision*, W.H. Freeman and Company, 1982. The primal sketch model constitutes a symbolic or token representation of image intensity variations and their local geometry. According to the definition of primal sketch given in the Marr reference, the process of generating a primal sketch involves the following two steps. First, a classical visual edge is extracted as the zero-crossing position of a Laplacian or Gaussian-filtered image. Then the edge-segment descriptors, bars, and blobs are grouped into units, associated with properties such as length, width, brightness, and position in the image to form the primal sketches. Compared with an edge model, the primal sketch model refers not only to the two-dimensional geometry of images but also to the intensity changes by relevant gray-level information across them. It makes the primal sketch model a rich representation of images.

Moreover, recent progress shows that primal sketches can be well represented by examples, and the dimensionality of image primitives, such as primal sketch, is intrinsically very low. Thus, it is possible to represent the primal sketches of natural images by a limited number of examples. For example, it has been shown that primal sketches of an image can be learned from those of other generic images. Given a low-resolution image, a set of candidate high frequency primitives can be selected from the trained data based on low frequency primitives to enhance the quality of the up-sampled version. Thus, in one implementation, the exemplary system 100 selects primal sketch-based primitive elements and includes a coding framework that degrades edge-related regions, to be later recovered by primal sketch-based learning.

Exemplary Primal Sketch-based Primitive Patch

Generally, during compression, an original image I(x) is locally filtered with a low-pass filter $G_L(x)$ of unity integral, accompanied with quantization noise q(x). It can be modeled as in Equation (7):

$$\tilde{I}(x)=I(x)*G_L(x)+q(x). \quad (7)$$

The degraded information of signal I(x) during compression is the difference between I(x) and $\tilde{I}(x)$ which could be estimated as in Equation (8):

$$d=I(x)-\tilde{I}(x)\approx I(x)*G_H(x)+q'(x) \quad (8)$$

where $G_H(x)$ and q'(x) correspond to local high-pass filtering and quantization noise. This approximation, although theoretically not precisely accurate, is yet practical. At high and medium quality levels, quantization noise has a relatively low effect on the difference signal: there is some similarity between a histogram of its compressed version and that of its high-pass filtered version. Thus, the distortion caused by compression at high quality levels can be simulated as the high frequency components of the original signal, despite quantization noise.

Furthermore, the distortion, especially large distortion, caused by compression mainly focuses on high frequency regions of an image. Accordingly, compression tends to cause a considerable truncation of high frequency energy in primal sketch regions along visual edges, while introducing relatively few effects in low frequency regions of the image. As humans are more sensitive to high-contrast intensity changes, such a type of distortion would result in visible artifacts and thus degrade the perceptual quality of the entire image.

Figure 3:
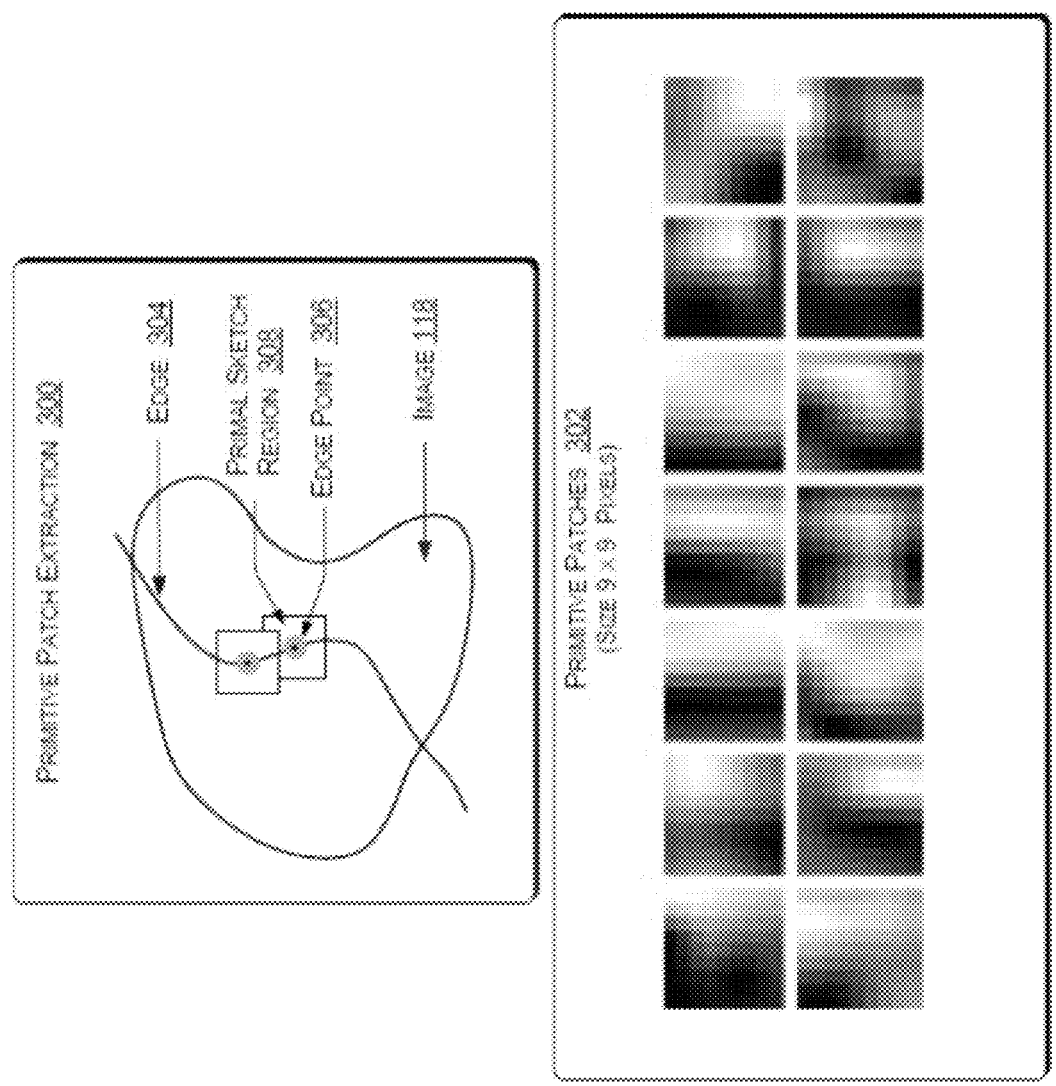
FIG. 3 is a diagram of exemplary primitive patch extraction and primitive patches.

So, it is useful to exploit the high frequency signal of primal sketch regions. FIG. 3 shows an example of primitive patch extraction 300. In one implementation of the exemplary system 100, primitive elements are edge-centered N×N patches 302, referred to herein as "primitive patches" 302. Edges 304 for generating the primitive patches are extracted by convolving image signal I(x) with the derivative of a Gaussian function $\Psi(x;\sigma,\theta)$ at scale $\sigma$ and orientation $\theta$, as shown in Equation (9):

$$E(x)=I(x)*\Psi(x;\sigma;\theta). \quad (9)$$

An edge point 306 is identified by finding the local maximum in the magnitude of the response. Then, as shown in FIG. 3, the primal sketch regions 308 are extracted along the edge points whose local maximum is recognized as an edge. After high-pass filtering, the "patch" containing the high frequency signal of a primal sketch region 308 is treated as a primitive patch 302. Some examples of primitive patches of size 9×9 pixels are also depicted in FIG. 3.

Exemplary Learning-based Patch Mapping

Building on the above analysis, exemplary learning-based mapping studies the high-frequency components both of original primal sketch regions 308 and of their distorted versions. The idea is to build a generic relationship between the original primitive patch 302 and its recovered version. Trained data that contain pairs of patches are obtained from a set of generic images.

Figure 4:
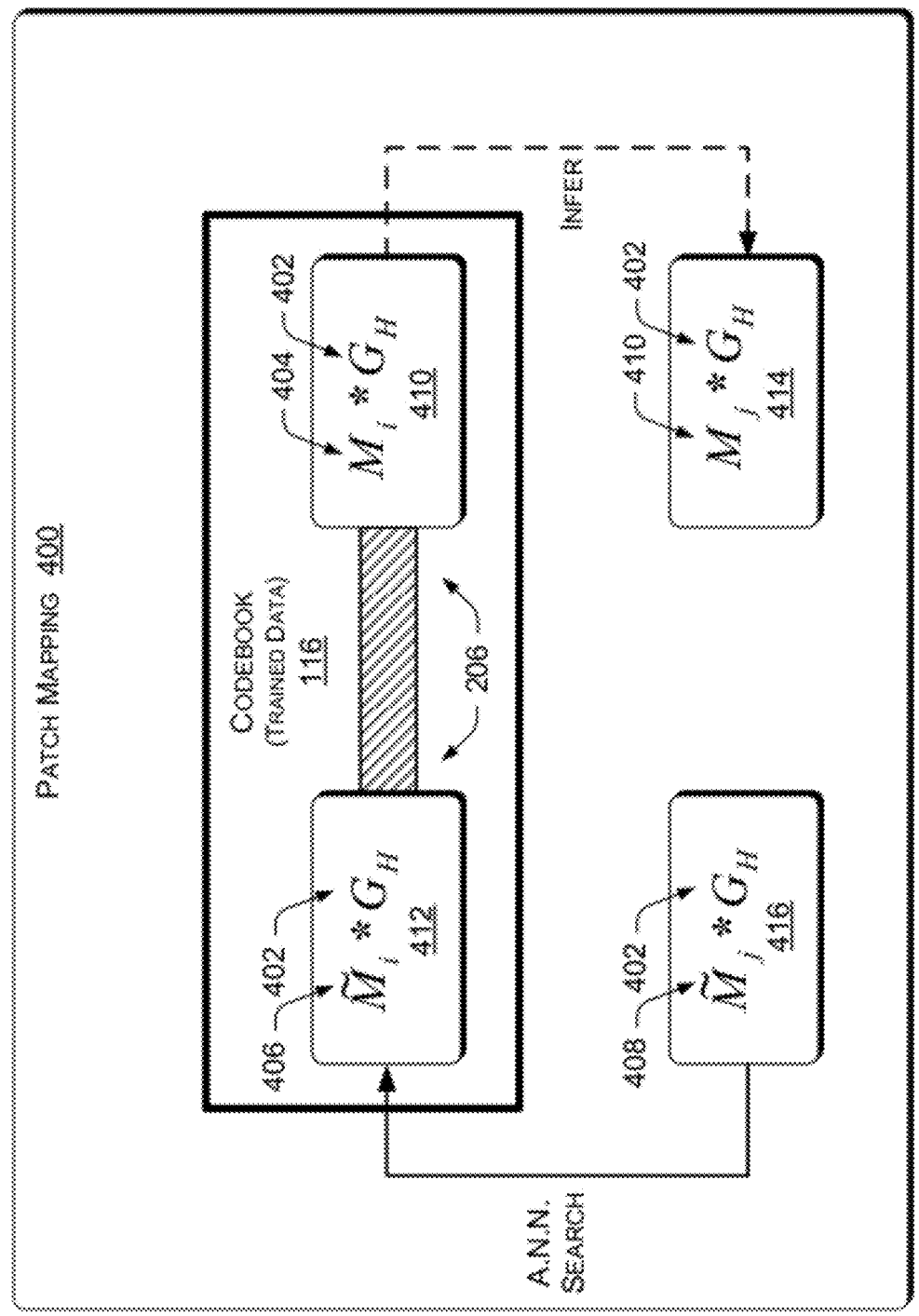
FIG. 4 is a block diagram of exemplary patch mapping.

FIG. 4 shows exemplary patch mapping 400. In FIG. 4, $G_H$ is a high-pass filter 402. The variables i and j denote two different images. $M_i$ 404 is an original primal sketch region 408 of image i, and $\tilde{M}_i$ 406 is its distorted version. Given a distorted patch $\tilde{M}_j$ 408 of input image j, the goal is to use the similarity between primitive patches and their distorted versions, i.e., as derived from training images (e.g. $M_i*G_H$ 410 and $\tilde{M}_i*G_H G_H$ 412 of image i), to infer the missing high frequency signal $M_j*G_H$ 414 according to the undistorted patch $M_j$ 410.

An important aspect of this patch mapping process 400 is the definition of similarity. This similarity should be able to measure the relationship between primitive patch $M_i$ 404 and its distorted version $\tilde{M}_i$ 406 in an image i. Meanwhile, it is also necessary to measure the relationship between primitive patches from different images, such as $\tilde{M}_i*G_H$ 412 and $\tilde{M}_j*G_H$ 416. The metric should be able to preserve recognizable features between an original patch 404 and its distorted version 412 in one image, and at the same be able to be applied across patches of different images.

For image patches generally, it may be hard to find a proper metric. But since patch primitives in contour regions are of low dimensionality, it is possible to represent the possible primitive patches by an affordable number of examples and further create appropriate patch mapping.

Let $N=M*G_H$ denote an original primitive patch, and N' be its most similar patch in terms of pixel value. The metric $e(N)=\|N-N'\|/\|N\|$ is used to evaluate the effectiveness of patch mapping 400. For a given match error e, the hit rate h represents the percentage of test data with match errors are less than e. Receiver Operating Characteristic (ROC) curve can be adopted to show the relationship between e and h. At a given match error, a high hit rate indicates a good generalization of the training data, which indicates that the training data are of low dimensionality.

Exemplary Training Engine (Primitive Patch Learning)

Figure 5:
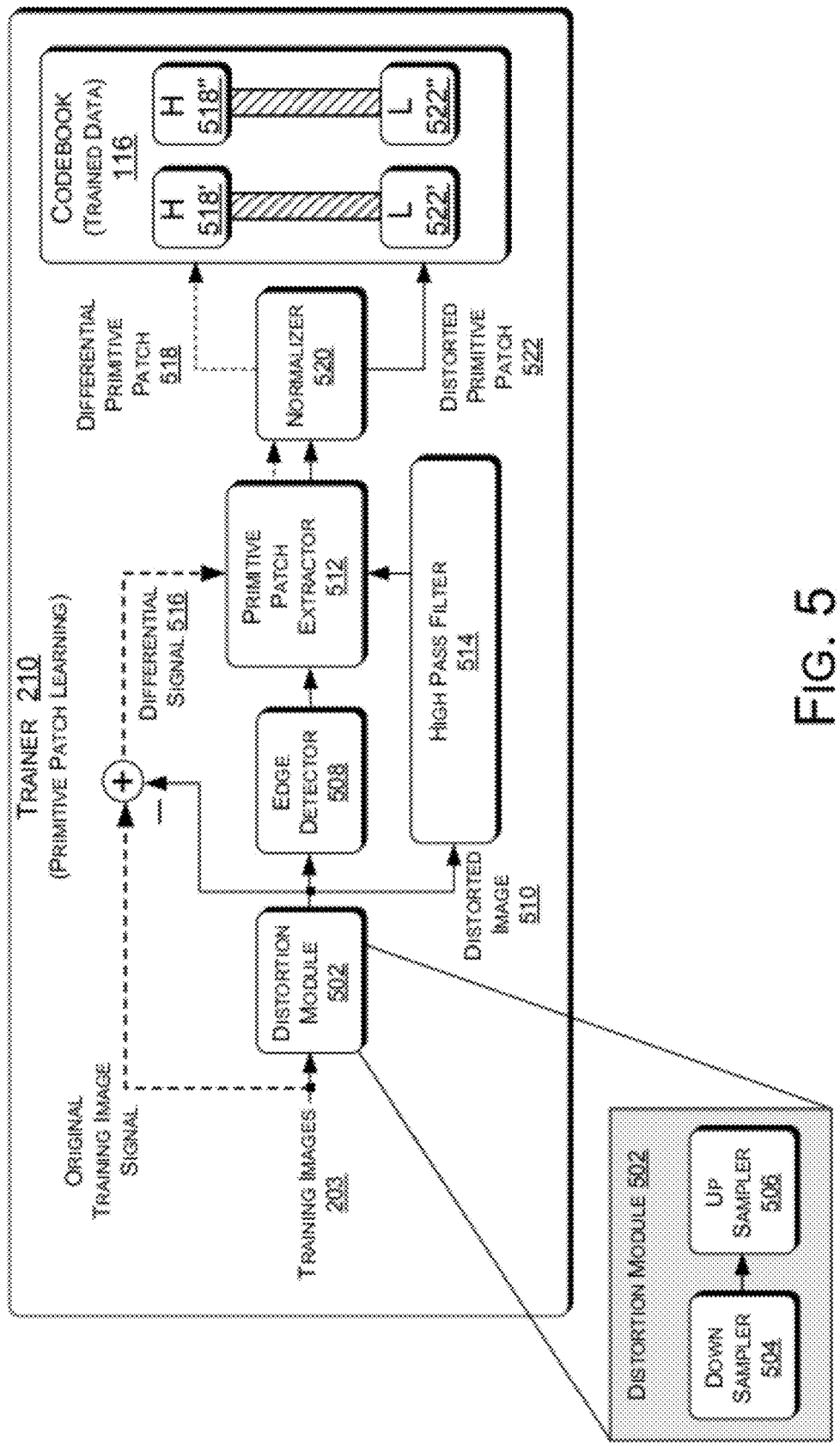
FIG. 5 is a block diagram of an exemplary trainer for primitive patch learning.

Based on the above analyses, learning-based patch mapping 400 is applied to develop the relationships between primitive patches. FIG. 5 shows the exemplary trainer 210 (FIG. 2) for primitive patch learning, in greater detail. The illustrated implementation is only one example configuration, for descriptive purposes. Many other arrangements of the components of an exemplary trainer 210 are possible within the scope of this described subject matter. Such an exemplary trainer 210 can be executed in hardware, software, or combinations of hardware, software, firmware, etc.

In FIG. 5, the dashed lines indicate a signal of an original training image 203, while the solid lines indicate a signal of the distorted training image 510. Given an input training image 203, a distortion module 502 simulates the process of lossy compression. For example, in one implementation, a distortion module 502 includes a down-sample filter 504 followed by an up-sample filter 506. Then, an edge detector 508, such as an orientation energy-based edge detector, is applied to the reconstructed distorted image 510.

According to the detected edge information, the primal patch extractor 512 determines primal sketch regions 408 of both the distorted image (input from the high-pass filter 514) and the differential signal 516 that represents the difference between the distorted image 510 and the original training image 203. In this training, a distorted primitive patch 522 and the differential primitive patch 518 at the same image position are treated as a primitive pair in the following process. After the normalizer 520, each pair of primitive patches is categorized into several categories, e.g., by an edge classifier, according to the edge type and orientation of the distorted primitive patch 522, and correspondingly stored into the trained set 116. Subsequently, certain clustering techniques may be applied to shrink the size of the trained set 116 to a desirable level.

Specifically, let and $\tilde{M}_i$ and $\tilde{M}_j$ denote the primitive patches 522 of high-pass filtered distorted images $\tilde{I}_i*G_H$ and $\tilde{I}_j*G_H$, $\sigma_i$ and $\sigma_j$ are the standard deviations with respect to the luminance distributions in $\tilde{I}_i*G_H$ and $\tilde{I}_j*G_H$, respectively. At primal sketch regions 408, if a normalized primitive patch 522' of a distorted image $\tilde{I}_i*G_H$ is similar to a normalized primitive patch 522 of another distorted image $\tilde{I}_j*G_H$, the relationship between the corresponding normalized original primitive patches of image $I_i*G_H$ and $I_j*G_H$ can be learned well by the exemplary learning-based training method. In other words, if primitive patch $\tilde{M}_i/\sigma_i$ is similar to $\tilde{M}_j/\sigma_j$, the decoder can deduce the primitive patch $M_j/\sigma_j$ from $M_i/\sigma_i$ by the mapping given in Equations (9) and (10), the latter primitive patch $M_i/\sigma_i$ being found in the trained data 116.

$$\tilde{M}_i/\sigma_i \leftrightarrow \tilde{M}_j/\sigma_j \quad (9)$$

$$M_i/\sigma_i \leftrightarrow M_j/\sigma_j \quad (10)$$

An advantage of the exemplary patch mapping 400 is that it provides a very natural means of specifying image transformations. Rather than selecting between different filters, the exemplary patch mapping 400 simply works by being supplied with an appropriate exemplar that can directly index the trained set 116 or be used directly as a search criterion, without having to perform additional or in-between processing.

Codebook Compression

Referring back to FIG. 2, which depicts server-side components 200, the compressor 212 can significantly reduce the file size of the codebook 116 and then save bandwidth in delivery. Since the codebook 116 may have a unique data structure, a more suitable compression technique can be customized for its compression than conventional tools such as ZIP compression. The codebook 116 is mainly composed of a number of pairs of the low-frequency and high-frequency primitive patches 302, as shown in the codebook 116 in FIG. 5.

These primitive patches 302 are grouped into a number of subclasses (e.g., 48 subclasses in one implementation) by an edge classifier according to the edge type and orientation of the distorted primitive patch. Each subclass may be built as an artificial neural network (ANN) tree. The primitive patches 302 in each subclass present with some similarity, and the elements in each N×N patch also present with some spatial correlations. The similarity and correlations can be exploited and utilized by the compressor 212. In particular, in one implementation, predictive coding is used to exploit the spatial correlations within a patch, and context-based arithmetic coding is used to exploit the correlations among patches.

Taking a 9×9 primitive patch 302 as an example, it should be noted that the original element is stored as a 4-byte floating-point value. To make this easier to compress, the compressor 212 converts the 4-byte floating-point value to an integer value by scaling and quantization. This operation may lose precision, but can achieve the trade-off between compression ratio and quality in reconstruction.

FIG. 6(*a*) depicts an illustrative 9×9 patch. The compressor 212 compresses its elements in the raster scan order. For the compression of the current element "A," the compressor 212 first obtains its prediction "refA" from either its "up" neighbor "uA" or its left neighbor "1A." For the first element in the patch, the compressor 212 sets its prediction "refA" as a constant. For the element in the first row (excluding the first element), the prediction is from its left neighbor 1A. Similarly, for the element in the first column (excluding the first element), the prediction is from its up neighbor uA. For the element in the other positions, the prediction is calculated with the schema shown in FIG. 6(*b*).

After obtaining the prediction, the compressor 212 calculates the residue of the current element by subtracting the prediction value. The residue is composed of a sign and magnitude. The sign is directly compressed with the arithmetic coder, and the magnitude is compressed with a context-based arithmetic coder. The patches in the same category present some similarity, because they are grouped according to their edge types and orientation of energies. There are two ways to define the contexts to utilize this property. The first method is to extract the probability distribution model of the current element according to its co-located elements in previous patches. Accordingly, one implementation defines 9×9=81 contexts in the arithmetic coder, and each context corresponds to the probability distribution model of residues at a certain position in the patch.

The second method is to extract the probability distribution model according to its neighbor elements. In one implementation, the compressor 212 takes the "up" and "left" neighbors as an example. In particular, the magnitude is quantized to M bits (e.g., 4 bits). Then, the compressor 212 defines 2M×2M (e.g., 24×24=256) contexts in the arithmetic coder. This magnitude is taken as zero if the neighbor does not exist. The compressor 212 can also combine the two methods to define contexts. However, the number of contexts becomes too large to be used in practice.

Exemplary Server-Side Components and Methods

Figure 7:
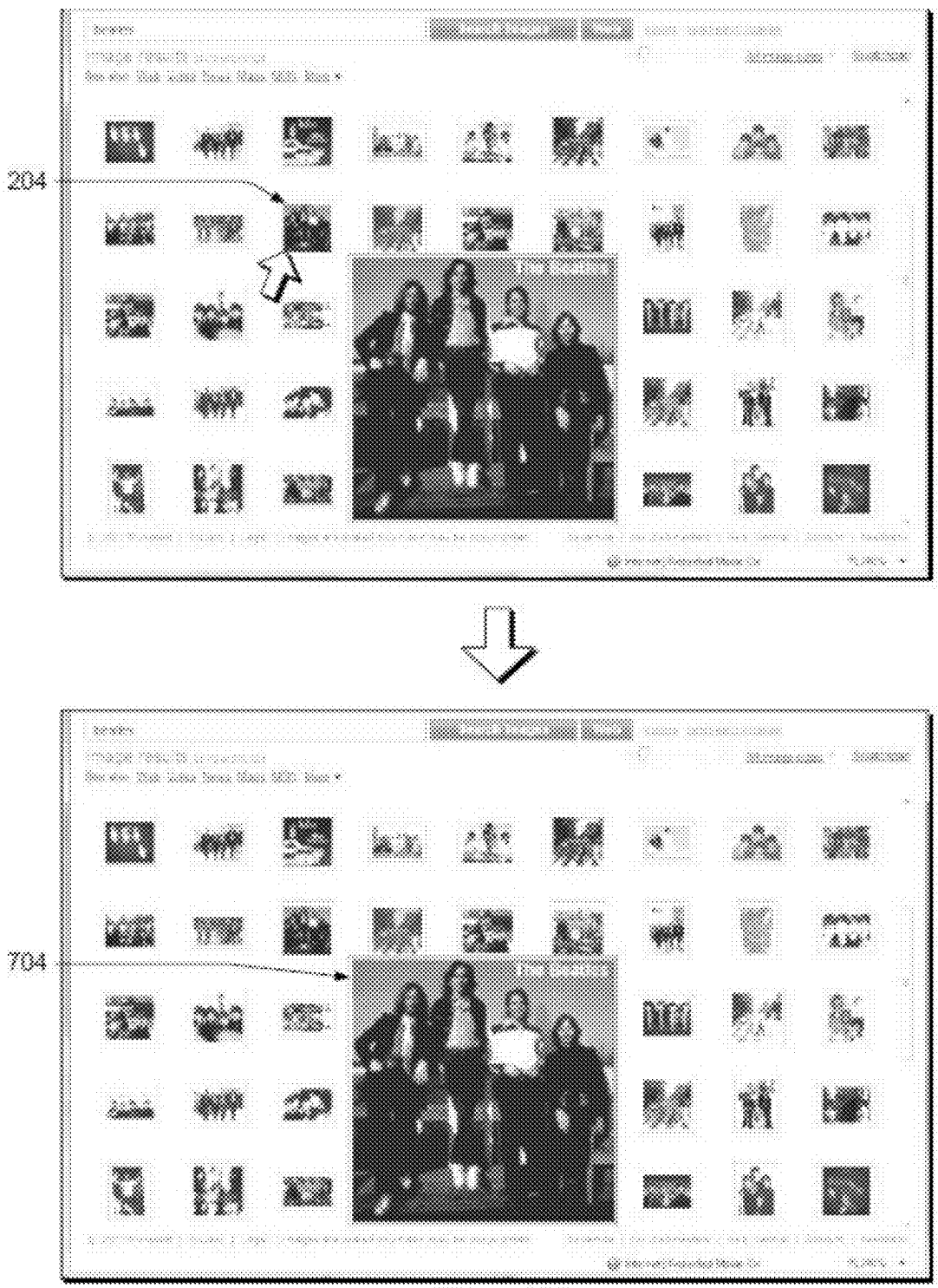
FIG. 7 is a diagram of an exemplary generalized scenario of thumbnail enlarging.

In the exemplary image resizing system 100, learning-based image enlarging on the client-side enriches the user experience of previewing thumbnail images, without downloading the original versions. FIG. 7 depicts an application scenario. When the user moves the mouse pointer onto a thumbnail image 204 of interest (a "mouseover"), a browser with the exemplary image resizing plug-in 122 may change the thumbnail 204 into an enlarged image 704 for better preview. The plug-in 122 facilitates the learning-based image resizing, employing complexity control and quality control.

Figure 8:
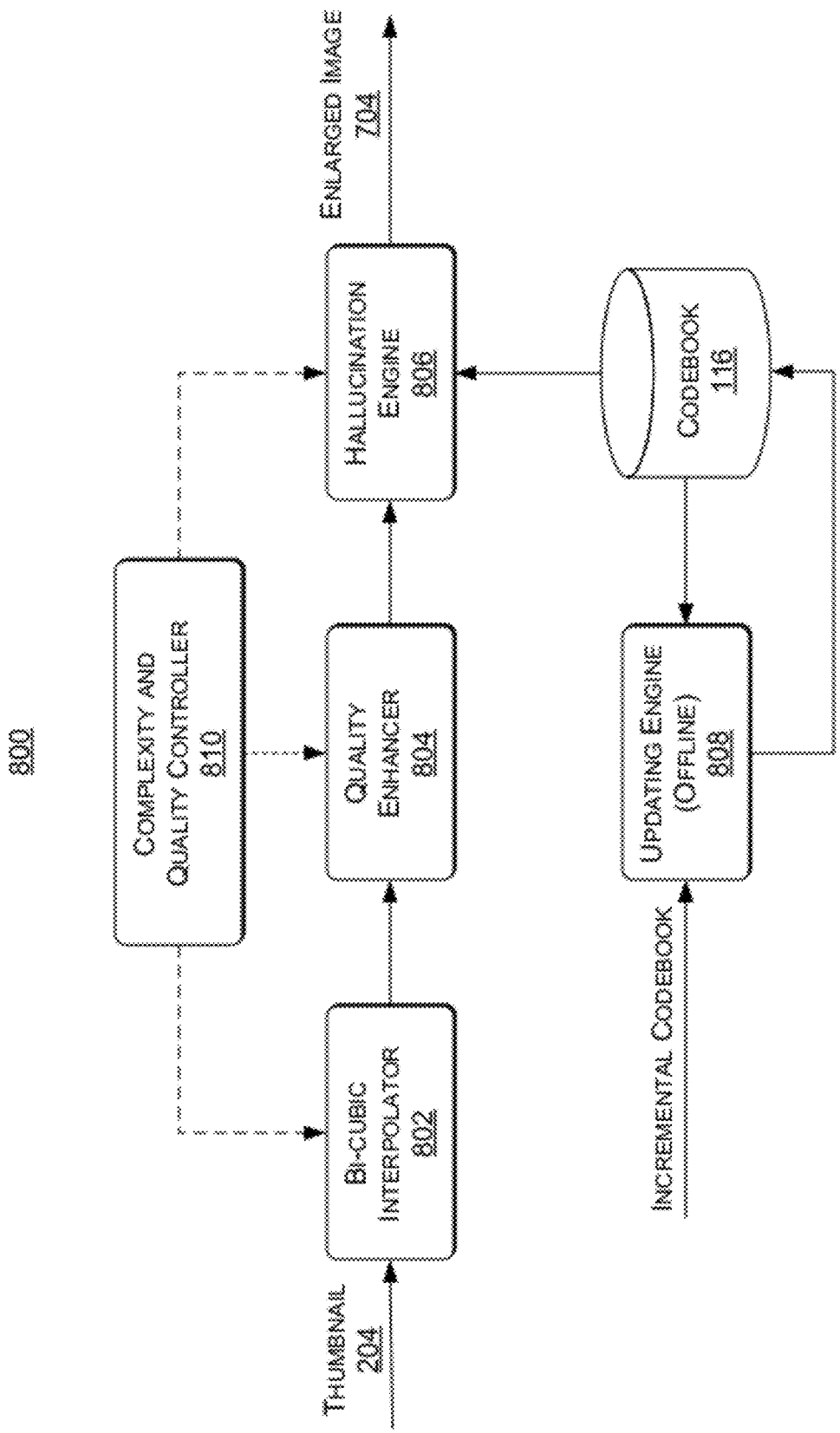
FIG. 8 is a block diagram of exemplary thumbnail enlarging components.

FIG. 8 depicts an exemplary image resizing architecture 800. The image resizing can be performed online, upon a request to the server. First, the thumbnail image 204 is up-sampled to a larger version 704 through the bi-cubic interpolator 802. Other interpolation approaches such as bilinear interpolation may also been employed. The quality enhancer 804 can then perform optional image quality enhancement to improve the visual quality. For example, when the thumbnail 204 has significant block artifacts due to JPEG compression, then de-blocking filtering can be applied to remove these artifacts.

The hallucination engine 806 then further refines the enlarged image 704, applying the codebook 116. It should be noted that the updating engine 808 can maintain the codebook 116 offline with respect to the image resizing functionality. If the server has an incremental codebook update available, then the client 114 can download this update offline to reshape the codebook 116.

Considering the computing resources used and/or the delay in thumbnail previewing, the complexity control modality of the "complexity and quality" controller 810 can perform in harmony with the hallucination engine 806.

To guarantee the highest degree of quality enhancement, quality control can also be applied. In general, the image enhancement starts from the image regions with the largest distortions, and thereby highest visual quality can be achieved by accomplishing the most dramatic change first, given the available computing resources and/or predefined display delays.

Exemplary Image Hallucination

In one implementation, the exemplary hallucination engine 806 constructs a high-frequency version of the image from the high-frequency primitives in the codebook 116 by using patches in the low-frequency image to index corresponding low-frequency primitives in the codebook 116. The low-frequency primitives in the codebook 116 are paired with high-frequency primitives used to make the high-frequency version of the image. The constructed high-frequency image is then blended with the low-frequency image to enhance its quality. The exemplary image resizing system 100 employs the method in Jian Sun, Nan-Ning Zheng, Hai Tao, Heung-Yeung Shum, "Image Hallucination with Primal Sketch Priors," *Proceedings of the* 2003 *IEEE Conference on Computer Vision and Pattern Recognition*, Jun. 16-22, 2003, as an example. Moreover, some operations are improved to provide quality control scalability and complexity control scalability.

Figure 9:
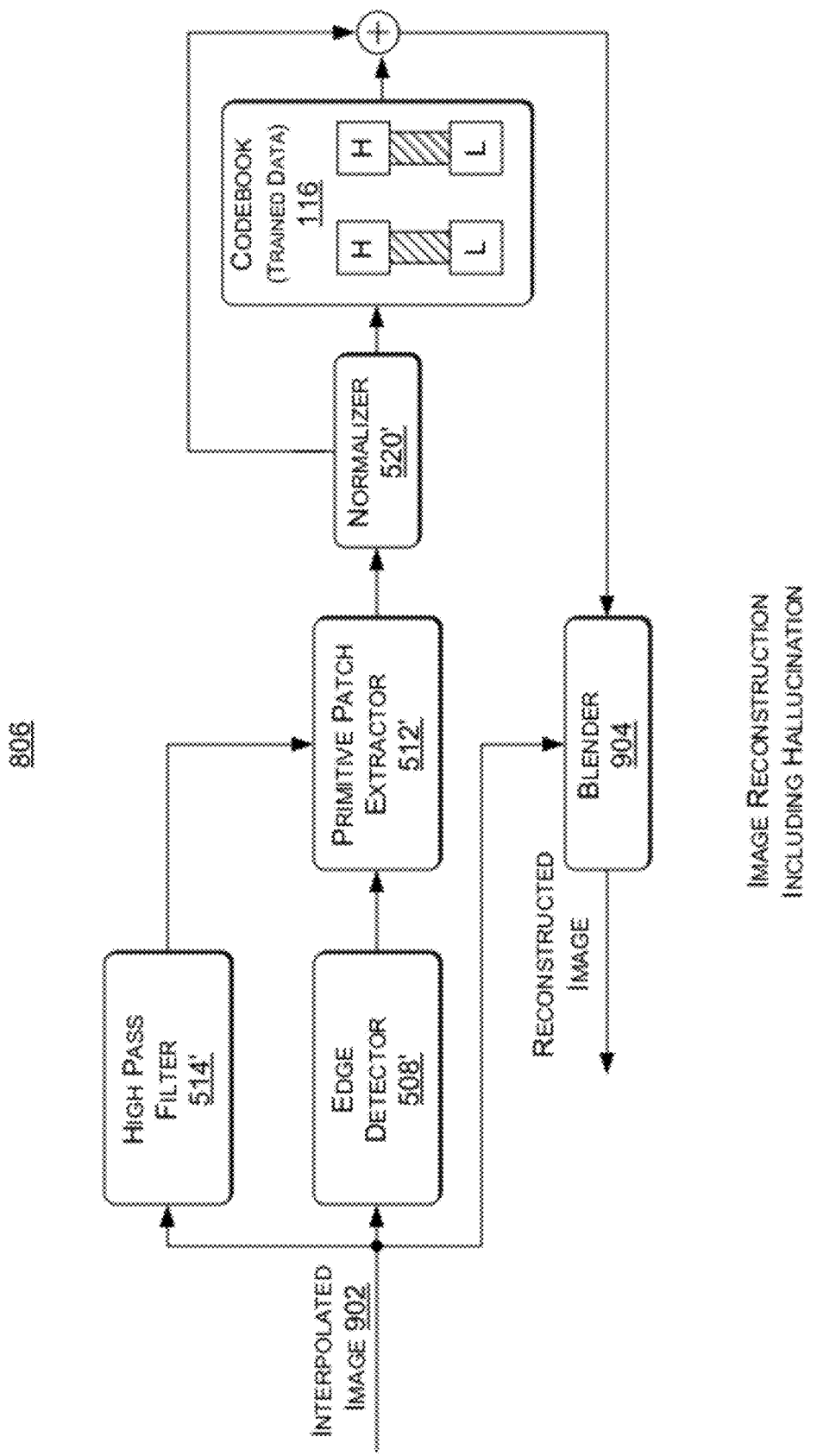
FIG. 9 is a block diagram of an exemplary image hallucinator and blender.

FIG. 9 shows an implementation of the hallucination engine 806 in greater detail. The interpolated image 902, that is, the low-frequency interpolated image 902, e.g., after quality enhancement, serves as an input. In particular, the primitive patch extractor 512' aims to enhance with high-frequency information at primal sketch regions. Thus the edge detector 508' is applied on the low-frequency image to find these primal sketch regions. The primitive patches 302 are then extracted by the same method used in codebook training, as shown back in FIG. 5. For each extracted primitive patch 302, the primitive patch extractor 512' searches the trained codebook 116 to find a potential candidate using an artificial neural network (ANN) method. The image blender 904 utilizes an averaging operator for pixel values in overlapped regions. For non-primal sketch regions, in one implementation the up-sampled values are used directly.

Exemplary Quality and Complexity Control

The quality of the small-size thumbnail 204 has a large impact on the quality of the image 704 after resizing. Typically, the thumbnail 204 is usually compressed by JPEG compression, for example, in real web-based applications. The undesirable JPEG compression artifacts may be amplified in the high-resolution image. In one implementation of the exemplary image resizing system 100, how to reduce these artifacts can become a major problem of quality control.

Referring back to FIG. 8, in one implementation, the complexity and quality controller 810 conducts quality control at various stages of the image hallucination. For example, de-blocking (i.e. smoothing across block boundaries) can first be applied to the interpolated image 902 before the edge detector 508' operates in order to avoid extracting edges along the block boundaries that should not be visible there. The artifact level in a block is related to the quantization parameter (QP) of JPEG compression. "QP" can be used to indicate the artifact level, and is already available in image hallucination. The artifact level is then used to control the strength of the smoothing across block boundaries. In particular, the complexity and quality controller 810 applies strong filtering on those blocks with a high artifact level, but extracts the high-frequency signals associated with edges from the codebook 116 during operation of the hallucination engine 806.

Since the hallucination of the high-frequency image is mainly performed on the edge regions, the number of edges determines the overall operations of the hallucination engine 806. That is to say, the number of edges has a large impact on the complexity. Therefore, the complexity modality of the complexity and quality controller 810 first applies the complexity control during operation of the edge detector 508'. Moreover, an early termination process can be applied to the ANN search within the primitive patches matching, if computing resources are not amply available.

Exemplary Method

Figure 10:
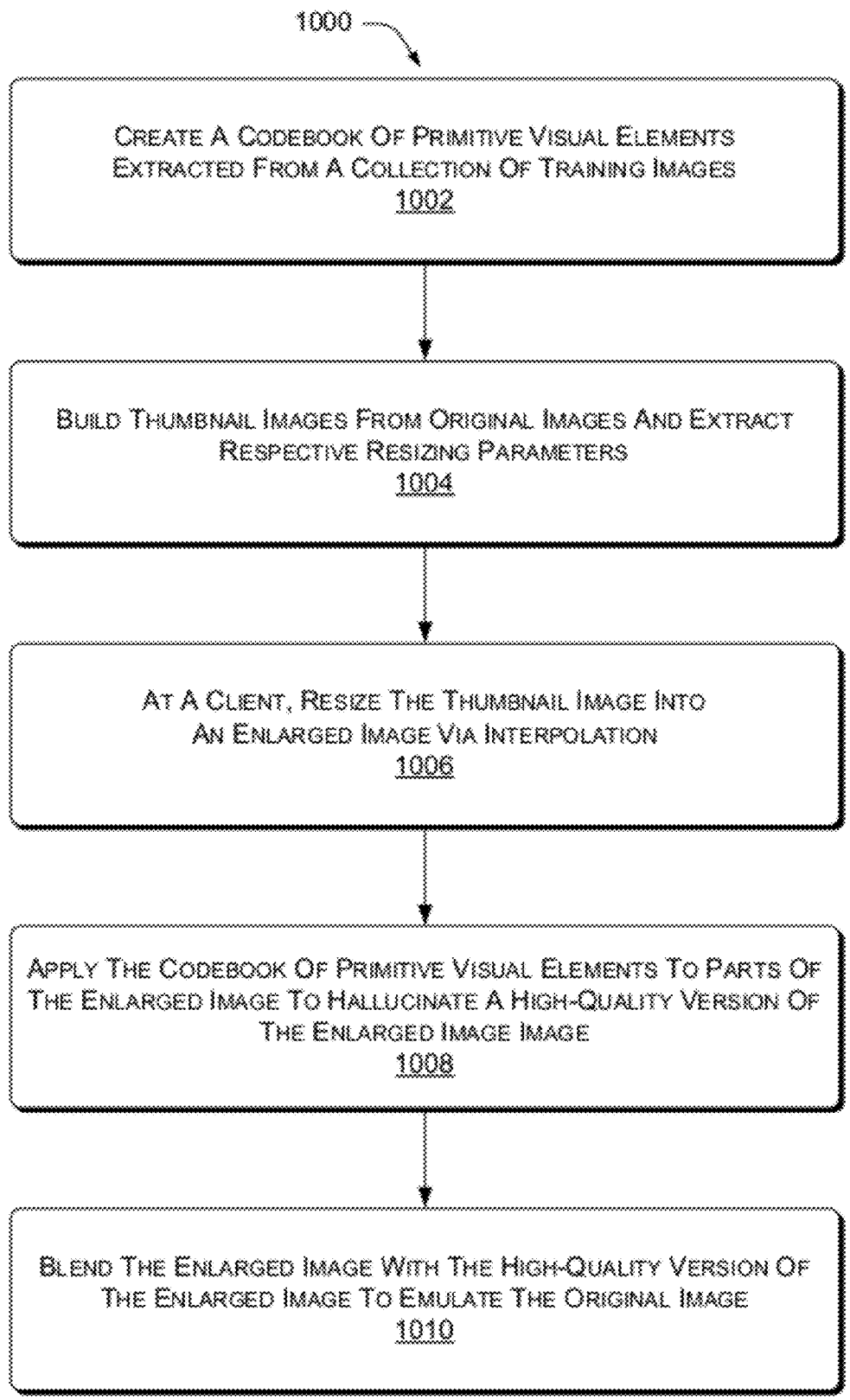
FIG. 10 is a flow diagram of an exemplary method of image resizing for web-based image searching.

FIG. 10 shows an exemplary method 1000 of image resizing at a remote client without downloading the resized image. In the flow diagram, the operations are summarized in individual blocks. The exemplary method 1000 may be performed by combinations of hardware, software, firmware, etc., for example, by components of the exemplary image resizing system 100.

At block 1002, a codebook of primitive visual elements is created from a collection of training images. In one implementation, the codebook is generated from training images collected from popular web searches. A statistical treatment is applied to web search logs to find the most popular image searches. Then, the codebook may be kept relevant and current by sending incremental updates based on newly popular image searches.

To find primitive visual elements for the codebook within a training image, the method 1000 can include detecting visual edges in each training image, and finding edge-centered patches of each image within image regions known as primal sketch regions. Primitive patches are extracted from the primal sketch regions, and a low-frequency/low-quality version of each primitive patch is paired with a high-frequency/high-quality version of the primitive patch for the codebook. The codebook thus consists of low and high-frequency primitive patch pairs.

These primitive patch pairs provide fundamental primitive visual elements used as general purpose visual building blocks for hallucinating or synthesizing most images—or at least popular images with similarity to those from which the codebook was trained. The low-frequency member of each pair is used to index the entire pair. That is, a thumbnail image that has been enlarged through interpolation constitutes a low-frequency version of the image. When the method 1000 finds a patch to enhance in this low-frequency image, the method 1000 tries to find a low-frequency primitive patch in the codebook that matches the low-frequency patch to be enhanced. When the method finds a match, e.g., through an ANN search, then the high-frequency member of the found pair is used to refine the image at the location of the low-frequency patch.

After its creation, the codebook is then sent to a user's browser, e.g., over a background channel, and can be used to resize many images.

At block 1004, thumbnail-sized images are generated by an exemplary technique that combines conventional thumbnail generation with extraction of resizing parameters. The resizing parameters are of little data size and can be stored with the thumbnail. Other metadata may also be derived at this point, during thumbnail production, such as flags that indicate which regions of each image can be hallucinated to higher quality later on during resizing, and/or flags that indicate whether an image is amenable to hallucination via the codebook at all.

At block 1006, when a client selects a thumbnail image in order to see a larger version of the thumbnail, the thumbnail is interpolated into a larger image via bi-cubic or bilinear interpolation. Although the thumbnail at this point in the method 1000 has been enlarged, it is of low quality.

At block 1008, a high-quality version of the enlarged image is generated in a manner that is similar to the process that was used to create the codebook. That is, the method finds primal sketch regions in the low-frequency enlarged image and extracts visual patches, such as edge-centered patches, to be used as index keys for searching the codebook. When a low-frequency patch from the image matches a low-frequency member of a primitive patch pair in the codebook, then that pair is selected to enhance the patch in the image. The high-frequency (or "good" quality) member of the primitive patch pair is substituted as the primitive visual element for the image, at the location of the image patch being processed.

At block 1010, the high-frequency version of the image just created is now blended with the enlarged image that was interpolated from the thumbnail, i.e., the low-frequency version of the image. This blending creates a reconstructed image that emulates the visual quality of the original image from which the thumbnail was generated.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method of resizing a thumbnail image to a larger image without downloading the larger image, comprising:
   under control of one or more processors configured with executable instructions:
   receiving a thumbnail image and resizing parameters, the resizing parameters comprising a plurality of parameters that were extracted when the thumbnail image was generated from an original image by downsampling;
   enlarging the thumbnail image to a low-frequency enlarged image;
   applying a codebook of primitive visual elements to parts of the low-frequency enlarged image to hallucinate a high-frequency version of the enlarged image for emulating the quality of the original image, wherein the codebook of primitive visual elements includes a codebook that is created from a collection of training images.

2. The method as recited in claim 1, further comprising blending the low-frequency enlarged image with the high-frequency enlarged image to emulate an image quality level of the original image.

3. The method as recited in claim 1, further comprising applying the resizing parameters to a region of the thumbnail image.

4. The method as recited in claim 1, further comprising creating the codebook at a remote client or receiving, at the remote client, the codebook from a server.

5. The method as recited in claim 4, further comprising receiving, by a browser at the remote client, the codebook and an image resizing plug-in via a background channel.

6. The method as recited in claim 1, wherein the codebook of primitive visual elements is trained from a collection of images associated with statistically popular image search queries on the Internet.

7. The method as recited in claim 1, further comprising receiving the codebook in a compressed format.

8. The method as recited in claim 1, further comprising receiving incremental updates of the codebook, the incremental updates being obtained based on new training images from newly popular image search queries on the Internet.

9. The method as recited in claim 1, wherein enlarging the thumbnail image comprises up-sampling the thumbnail image via interpolation, the interpolation comprising bi-cubic or bilinear interpolation.

10. The method as recited in claim 1, wherein applying the codebook of primitive visual elements comprises:
    finding high-frequency primitive visual elements in the codebook, the finding comprising:
       matching low-frequency primitive visual regions of the low-frequency enlarged image with corresponding low-frequency primitive visual elements in the codebook;
       for each low-frequency primitive visual element found as a match in the codebook, utilizing a corresponding high-frequency primitive visual element paired with a respective low-frequency primitive visual element in the codebook; and
    constructing high-frequency regions for the low-frequency enlarged image using the high-frequency primitive visual elements in the codebook.

11. The method as recited in claim 10, further comprising:
    applying edge detection on the low-frequency enlarged image to find primal primitive regions of the low-frequency enlarged image;
    extracting primitive visual elements from the primal primitive regions;
    applying an artificial neural network (ANN) search method for matching the low-frequency primitive visual regions of the low-frequency enlarged image with the corresponding low-frequency primitive visual elements in the codebook; and
    for non-primal primitive regions in the low-frequency enlarged image, directly using up-sampled image values from the thumbnail image.

12. The method as recited in claim 11, further comprising matching a depth of the ANN search method to available computing resources for complexity control or quality control.

13. The method as recited in claim 1, further comprising applying an image quality enhancement to the enlarged image prior to applying the codebook of primitive visual elements to the parts of the low-frequency enlarged image.

14. The method as recited in claim 13, wherein the image quality enhancement comprises de-blocking filtering to remove JPEG compression artifacts.

15. The method as recited in claim 1, further comprising applying quality control scalability and complexity control scalability in resizing the thumbnail image.

16. A system comprising:
    a processor;
    memory;
    a resizer stored in the memory and executable on the processor that enlarges a thumbnail image via interpolation into an enlarged image as directed by resizing parameters, the resizing parameters including a plurality of parameters that are extracted when the thumbnail image is created from an original image;
    a hallucinator stored in the memory and executable on the processor that synthesizes high-fidelity parts of the enlarged image by applying a codebook of primitive visual elements, the codebook of primitive visual elements includes a codebook that is created based on a collected of training images and provides universal visual parts for reconstructing images; and a blender stored in the memory and executable on the processor that combines the enlarged image with the high-fidelity parts to emulate the original image.

17. The system as recited in claim 16, wherein the hallucinatory is further configured to:

find high-frequency primitive visual elements in the codebook by:

matching low-frequency primitive visual regions of the enlarged image with corresponding low-frequency primitive visual elements in the codebook;

for each low-frequency primitive visual element found as a match in the codebook, utilizing a high-frequency primitive visual element paired in the codebook with the low-frequency primitive visual element; and construct high-frequency regions of the image using the high-frequency primitive visual elements in the codebook.

18. The system as recited in claim 17, further comprising:

an edge detector that finds primitive visual regions of the enlarged image associated with visual edges;

an extractor to derive primitive visual elements at the found primitive visual regions; and a mapper that applies an artificial neural network (ANN) search method for matching the derived primitive visual elements of the enlarged image with corresponding primitive visual elements in the codebook, each primitive visual element in the codebook being paired with a corresponding high-fidelity primitive visual element for reconstructing a high quality version of the original image.

19. The system as recited in claim 16, further comprising an updater that refreshes the codebook with new pairs of primitive visual elements obtained from new training images associated with new popular image search queries on the Internet.

20. A method comprising:

under control of one or more processors configured with executable instructions:

creating a thumbnail image from an original image;

extracting resizing parameters for the thumbnail image;

creating a codebook of primitive visual elements from a collection of training images, the primitive visual elements providing universal visual parts for reconstructing images;

transferring the thumbnail image and the resizing parameters to a remote client, the resizing parameters enabling the remote client to resize the thumbnail image to an enlarged image as directed by the resizing parameters; and transferring the codebook of primitive visual elements to the remote client, the codebook of primitive visual elements enabling the remote client to hallucinate a high-quality version of the enlarged image, and blending the enlarged image with the high-quality version of the image to emulate the original image.

* * * * *